(12) United States Patent
Haynes et al.

(10) Patent No.: US 11,255,628 B2
(45) Date of Patent: Feb. 22, 2022

(54) MONITORING SYSTEM FOR AN ARCHERY BOW, MONITORING DEVICES, AND METHODS FOR SAME

(71) Applicant: Stress Engineering Services, Inc., Mason, OH (US)

(72) Inventors: Clinton A. Haynes, Mason, OH (US); Shannon R. Read, Lebanon, OH (US); Joseph Krumme Bullard, West Chester, OH (US); Daniel L. Morrow, Batavia, OH (US)

(73) Assignee: Stress Engineering Services, Inc., Mason, OH (US)

( * ) Notice: Subject to any disclaimer, the term of this patent is extended or adjusted under 35 U.S.C. 154(b) by 0 days.

(21) Appl. No.: 16/950,933

(22) Filed: Nov. 18, 2020

(65) Prior Publication Data
US 2021/0071984 A1    Mar. 11, 2021

Related U.S. Application Data

(63) Continuation of application No. 16/362,882, filed on Mar. 25, 2019, now Pat. No. 10,852,095, which is a
(Continued)

(51) Int. Cl.
*F41B 5/14* (2006.01)
*F41B 5/12* (2006.01)
(Continued)

(52) U.S. Cl.
CPC ............. *F41B 5/123* (2013.01); *G01L 1/044* (2013.01); *G01L 5/047* (2013.01); *F41B 5/105* (2013.01); *Y10S 124/90* (2013.01)

(58) Field of Classification Search
CPC .... F41B 5/10; F41B 5/105; F41B 5/12; F41B 5/123; F41B 5/14; F41B 5/1403; Y10S 124/90
(Continued)

(56) References Cited

U.S. PATENT DOCUMENTS 4,741,320 A * 5/1988 Wiard .................. F41B 5/1476
124/23.1
5,060,626 A * 10/1991 Elliott ....................... F41B 5/10
124/86
(Continued)

FOREIGN PATENT DOCUMENTS

CN    201751798 U    2/2011
CN    204421744 U    6/2015
(Continued)

OTHER PUBLICATIONS

Wang, Yuting; First Office Action issued in Chinese Patent Application No. 201780079032.7; Apr. 21, 2021; 26 pages including English translation.
(Continued)

*Primary Examiner* — Alexander R Niconovich

(74) *Attorney, Agent, or Firm* — Ulmer & Berne LLP

(57) ABSTRACT

A cam assembly for an archery bow is provided. The cam assembly includes a cam body and an anchoring lug. The cam body defines a pivot axis and a groove circumferentially routed at least partially around the pivot axis. The anchoring lug is coupled with the cam body and includes a force sensor. The anchoring lug is offset from the pivot axis and is configured to facilitate attachment of a bow cord thereto. The force sensor is configured to facilitate detection of a tension on the bow cord as a function of a force imparted to the force sensor from the bow cord. An archery bow is also provided.

18 Claims, 10 Drawing Sheets

Related U.S. Application Data continuation of application No. 15/848,406, filed on Dec. 20, 2017, now Pat. No. 10,281,229.

(60) Provisional application No. 62/476,216, filed on Mar. 24, 2017, provisional application No. 62/436,869, filed on Dec. 20, 2016.

(51) Int. Cl.
*G01L 5/04* (2006.01)
*G01L 1/04* (2006.01)
*F41B 5/10* (2006.01)

(58) Field of Classification Search
USPC .................................. 124/25, 25.6, 86, 900
See application file for complete search history.

(56) References Cited

U.S. PATENT DOCUMENTS

| | | | | |
|---|---|---|---|---|
| 5,435,292 A | * | 7/1995 | Armstrong | F41B 5/14 124/25.6 |
| 6,082,346 A | * | 7/2000 | Andrews | F41B 5/10 124/25.6 |
| 7,337,773 B2 | * | 3/2008 | Simo | F41B 5/143 124/44.5 |
| 8,387,608 B2 | * | 3/2013 | Morris, II | F41B 5/148 124/86 |
| 8,899,220 B2 | * | 12/2014 | Morris, II | F41G 1/345 124/86 |
| 9,970,730 B2 | * | 5/2018 | Thacker, Jr. | F41B 5/1434 |
| 10,712,119 B1 | * | 7/2020 | Clum | F41B 5/14 |
| 2007/0151552 A1 | * | 7/2007 | Czemske | F41B 5/143 124/86 |
| 2011/0277738 A1 | * | 11/2011 | Morris, II | F41B 5/10 124/25.6 |
| 2018/0058961 A1 | * | 3/2018 | Dunham | F41B 5/1469 |

FOREIGN PATENT DOCUMENTS

| | | |
|---|---|---|
| CN | 104807373 A | 7/2015 |
| CN | 105627820 A | 6/2016 |

OTHER PUBLICATIONS

Wang Yuting; First Office Action issued in Chinese Patent Application No. 201780079032.7; Apr. 21, 2021; 24 pages, including English translation.

* cited by examiner

MONITORING SYSTEM FOR AN ARCHERY BOW, MONITORING DEVICES, AND METHODS FOR SAME

REFERENCE TO RELATED APPLICATIONS

This application is a continuation of U.S. patent application Ser. No. 16/362,882, entitled Monitoring System for an Archery Bow, Monitoring Devices, and Methods for Same, filed Mar. 25, 2019 which is a continuation of U.S. patent application Ser. No. 15/848,406, entitled Monitoring System for an Archery Bow, Monitoring Devices, and Methods for Same, filed Dec. 20, 2017, which claims priority of U.S. Provisional Patent Application Ser. No. 62/436,869, entitled Monitoring System for an Archery Bow, Monitoring Devices, and Methods for Same, filed Dec. 20, 2016, and U.S. Provisional Patent Application Ser. No. 62/476,216, entitled Monitoring System for an Archery Bow, Monitoring Devices, and Methods for Same, filed Mar. 24, 2017, and hereby incorporates these patent applications by reference herein in their entirety.

TECHNICAL FIELD

The apparatus and methods described below generally relate to an archery bow having at least one monitoring device for detecting operating conditions of the archery bow. Data from the monitoring device(s) is displayed to a user on a computing device.

BACKGROUND

When an archer shoots an arrow with an archery bow there are many different operating conditions that can affect the accuracy and/or the integrity of the bow.

SUMMARY

In accordance with one embodiment, a cam assembly for an archery bow is provided. The cam assembly comprises a cam body and an anchoring lug. The cam body defines a pivot axis and a groove circumferentially routed at least partially around the pivot axis. The anchoring lug is coupled with the cam body and comprises a force sensor. The anchoring lug is offset from the pivot axis and is configured to facilitate attachment of a bow cord thereto. The force sensor is configured to detect a tension on the bow cord.

In accordance with another embodiment, an archery bow comprises a limb attachment member, a pair of bow limbs, a cam assembly, and a bow cord. Each bow limb of the pair of bow limbs comprises a proximal end and a distal end. The proximal end of each bow limb of the pair of bow limbs is coupled with the limb attachment member. The cam assembly is pivotally coupled with the one of the distal ends of the bow limbs. The cam assembly comprises a cam body and an anchoring lug. The cam body defines a pivot axis and a groove circumferentially routed at least partially around the pivot axis. The anchoring lug is coupled with the cam body and comprises a force sensor. The anchoring lug is offset from the pivot axis. The bow cord is coupled with the anchoring lug and is routed along the groove of the cam body. The force sensor is configured to detect a tension on the bow cord.

In accordance with yet another embodiment, a cam assembly for an archery bow is provided. The cam assembly comprises a cam body and an anchoring lug. The cam body comprises a central portion, an outer ring, a web member, and a strain sensor. The central portion defines a pivot axis. The outer ring portion defines a groove circumferentially routed at least partially around the pivot axis. The web member extends between the central portion and the outer ring portion. The strain sensor is disposed on the web member and is configured to detect a tension on a bow cord from the web member. The anchoring lug is coupled with the cam body and is offset from the pivot axis. The anchoring lug is configured to facilitate attachment of a bow cord thereto.

In accordance with still yet another embodiment, an archery bow comprises a limb attachment member, a pair of bow limbs, a cam assembly, and a bow cord. Each bow limb of the pair of bow limbs comprises a proximal end and a distal end. The proximal end of each bow limb of the pair of bow limbs is coupled with the limb attachment member. The cam assembly is pivotally coupled with the one of the distal ends of the bow limbs. The cam assembly comprises a cam body and an anchoring lug. The cam body comprises a central portion, an outer ring, a web member, and a force sensor. The central portion defines a pivot axis. The outer ring portion defines a groove circumferentially routed at least partially around the pivot axis. The web member extends between the central portion and the outer ring portion. The force sensor is disposed on the web member. The anchoring lug is coupled with the cam body and is offset from the pivot axis. The bow cord is coupled with the anchoring lug and is routed along the groove of the outer ring portion. The force sensor is configured to detect a tension on the bow cord from the web member.

In accordance with still yet another embodiment, an anchoring lug for a cam assembly of an archery bow is provided. The anchoring lug comprises an anchor member, a pair of bellows members, an outer shroud, and a force sensor. Each bellows member of the pair of bellows members comprises a proximal end, a distal end, and a flexible portion that extends between the proximal end and the distal end. The proximal end of each bellows member is coupled with the anchor member. The outer shroud is coupled with the distal end of each bellows member of the pair of bellows members. The flexible portion of each of bellows member is selectively deformable such that the outer shroud is slidable with respect to the anchor member. The force sensor is associated with one of the anchor member, the outer shroud, and at least one of the bellows members and is configured to detect tension imparted to the anchoring lug based upon a position of the outer shroud relative to the anchor member.

In accordance with still yet another embodiment, a cam assembly for an archery bow is provided. The cam assembly comprises a cam body, a monitoring device, and a wireless communication module. The cam body defines a pivot axis and a groove circumferentially routed at least partially around the pivot axis. The monitoring device is configured to detect an operating condition of the cam assembly. The wireless communication module is in communication with the monitoring device and is configured to wirelessly transmit data from the monitoring device to a remote source.

In accordance with still yet another embodiment, an archery bow comprises a limb attachment member, a pair of bow limbs, a cam assembly, and a bow cord. Each bow limb of the pair of bow limbs comprises a proximal end and a distal end. The proximal end of each bow limb of the pair of bow limbs is coupled with the limb attachment member. The cam assembly is pivotally coupled with the one of the distal ends of the bow limbs. The cam assembly comprises a cam body, an anchoring lug, a monitoring device, and a wireless communication module. The cam body defines a pivot axis and a groove circumferentially routed at least partially around the pivot axis. The anchoring lug is coupled with the cam body and is offset from the pivot axis. The monitoring device is configured to detect an operating condition of the cam assembly. The wireless communication module is in communication with the monitoring device and is configured to wirelessly transmit data from the monitoring device to a remote source. The bow cord is coupled with the anchoring lug and is routed along the groove of the cam body.

In accordance with still yet another embodiment, a limb assembly for an archery bow is provided. The limb assembly comprises a bow limb and a monitoring device. The bow limb comprises a proximal end and a distal end. The distal end is configured to support a cam assembly and the proximal end is configured for attachment to a limb attachment member. The monitoring device is embedded in the bow limb and is configured to detect an operating condition of the limb assembly.

In accordance with still yet another embodiment, an archery bow comprises a limb attachment member, a pair of bow limbs, and a monitoring device. Each bow limb of the pair of bow limbs comprises a proximal end and a distal end. The proximal end of each bow limb of the pair of bow limbs is coupled with the limb attachment member. The monitoring device is embedded in one of the bow limbs and is configured to detect an operating condition of the bow limb.

In accordance with still yet another embodiment, a limb attachment assembly for an archery bow is provided. The limb attachment assembly comprises a limb attachment member and a monitoring device. The limb attachment member comprises a first end and a second end. Each of the first end and the second end is configured to support a bow limb. The monitoring device is embedded in the limb attachment member and is configured to detect an operating condition of the limb attachment member.

In accordance with still yet another embodiment, an archery bow comprises a limb attachment member, a pair of bow limbs and a monitoring device. Each bow limb of the pair of bow limbs comprises a proximal end and a distal end. The proximal end of each bow limb of the pair of bow limbs is coupled with the limb attachment member. The monitoring device is embedded in the limb attachment member and is configured to detect an operating condition of the limb attachment member.

In accordance with still yet another embodiment, a method for diagnosing an abnormality of an archery bow is provided. The method comprises detecting an operating condition of the archery bow from at least one onboard monitoring device of the archery bow, and comparing the operating condition to a threshold operating condition. The method further comprises identifying an abnormal condition based upon the comparing of the operating condition to the threshold operating condition, and presenting the abnormal condition to a user on a remote computing device.

In accordance with still yet another embodiment, a non-transitory computer readable medium having instructions stored thereon which when executed by a processor cause the processor to detect an operating condition of an archery bow from at least one onboard monitoring device of the archery bow, and compare the operating condition to a threshold operating condition. The instructions further cause the processor to identify an abnormal condition based upon the comparing of the operating condition to the threshold operating condition, and present the abnormal condition to a user on a remote computing device.

BRIEF DESCRIPTION OF THE DRAWINGS

Various embodiments will become better understood with regard to the following description, appended claims and accompanying drawings wherein:

DETAILED DESCRIPTION

Figure 1:
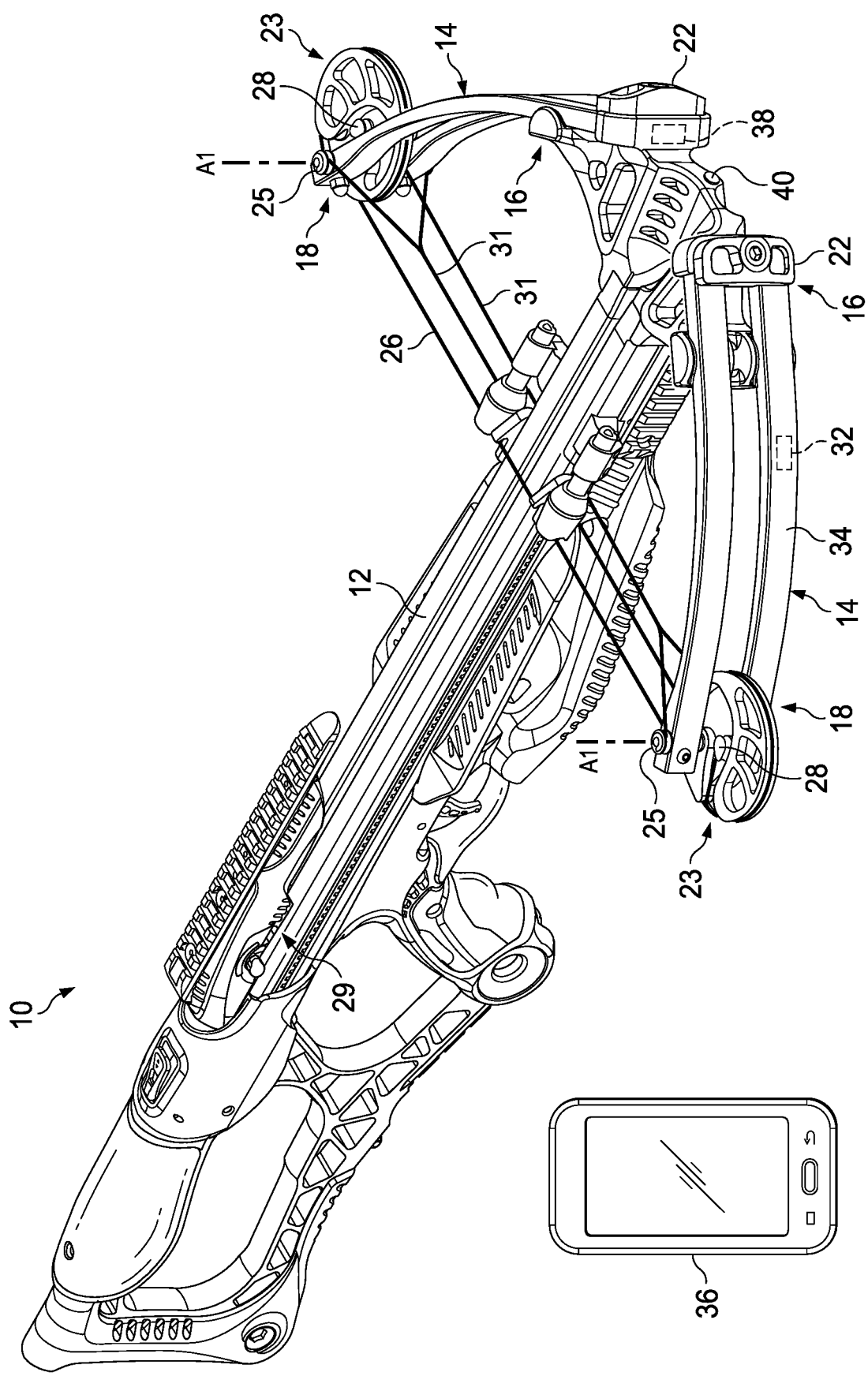
FIG. 1 is an isometric view depicting a crossbow having various monitoring devices in communication with a smartphone, according to one embodiment.

Embodiments are hereinafter described in detail in connection with the views and examples of FIGS. 1-11, wherein like numbers indicate the same or corresponding elements throughout the views. A crossbow 10 in accordance with one embodiment is generally depicted in FIG. 1. The crossbow 10 can include a stock 12, a riser 13, and a pair of bow limbs 14. In one embodiment, each of the bow limbs 14 can be formed of a fiber reinforced plastic (FRP) material. Each of the bow limbs 14 can include a proximal end 16 and a distal end 18. The riser 13 can be disposed at a front end 20 of the stock 12 of the crossbow 10.

Each of the proximal ends 16 of the bow limbs 14 can be configured for attachment to the riser 13. In one embodiment, as illustrated in FIG. 1, the proximal ends 16 can be selectively attached to the riser 13 by a respective clamping assembly 22. Each of the distal ends 18 of the bow limbs 14 can be configured to support a respective cam assembly 23. Each of the cam assemblies 23 can be pivotally coupled to one of the distal ends 18 of the bow limbs 14 by a pin 25 such that the cam assemblies 23 are each pivotable about a respective pivot axis A1. A bow string 26 can be attached to each of the cam assemblies 23 at an anchoring lug 28 (one shown) and routed along the cam assemblies 23 such that a portion of the bow string 26 is disposed between the cam assemblies 23. When the bow string 26 is pulled from a relaxed position (shown in FIG. 1) and into a firing position (not shown), the distal ends 18 of the bow limb 14 can be pulled towards each other and the cam assemblies 23 can simultaneously pivot with respect to the bow limbs 14.

When the bow string 26 is in the firing position, it can be engaged with a latch 29 to facilitate selective firing of an arrow (not shown) from the stock 12. The crossbow 10 can also include a pair of bow cables 31 that are each coupled with one of the cam assemblies 23 and with the pin 25 on the opposite bow limb 14. When the bow string 26 is pulled from a relaxed position (shown in FIG. 1) and into a firing position (not shown), each of the bow cables 31 can be partially wound onto one of the cam assemblies 23 to impart tension onto the cam assemblies 23 that facilitates firing of the arrow (not shown) when the bow string 26 is released from the firing position.

As illustrated in FIG. 1, the crossbow 10 can include a strain gage 32 that is provided on at least one of the bow limbs 14 and configured to detect the strain on the bow limb(s) 14. In one embodiment, as illustrated in FIG. 1, the strain gage 32 can be embedded in one of the bow limbs 14 such that an outer surface 34 of the bow limb 14 overlies the strain gage 32 and thus conceals the strain gage 32 from plain sight. In such an embodiment, the strain gage 32 can comprise a wire that is configured to detect strain on the bow limb(s) 14 based upon the elongation of the wire when the associated bow limb 14 is flexed. It is to be appreciated that the strain gage 32 can additionally or alternatively be mounted anywhere along the bow limb(s) 14 that facilitates measurement of the strain on the bow limb(s). The strain gage 32 can be powered by an onboard power source (not shown) which can, in some embodiments, comprise a power storage device (not shown) mounted in the riser 13 or other suitable location. The power storage device can be a disposable battery, a rechargeable battery, a supercapacitor or any of a variety of suitable alternative power storage arrangements. A rechargeable battery pack can be recharged through any of a variety of power sources, such as a wall plug, a solar panel, or energy harvested during retraction and/or firing of the bow string 26.

Figure 2:
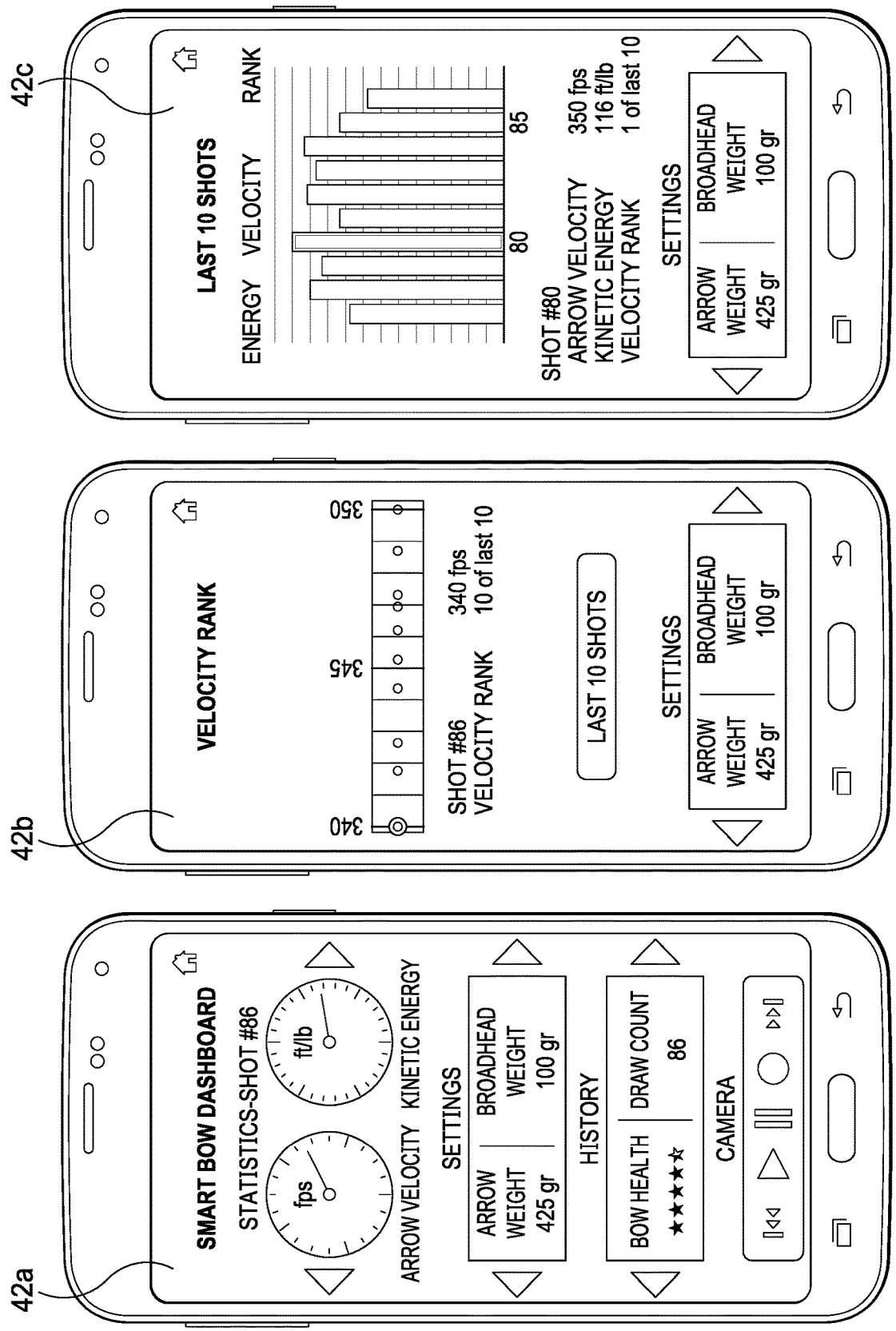
FIG. 2 is a front view of different graphical user interfaces displayed on the smart phone of FIG. 1.

The strain gage 32 can be communicatively coupled to a computing device (e.g., either wirelessly or with wires) and can transmit strain data to the computing device, as will be described in more detail below. In one embodiment, as illustrated in FIGS. 1 and 2, the computing device can comprise a smartphone 36 (e.g., an iOS or Android device) that has an application loaded thereon that is configured to analyze the strain data from the strain gage 32 and present various information to a user through the application. It is to be appreciated that any of a variety of suitable alternative computing devices are contemplated, such as, for example, a personal computer, a laptop, or a tablet.

The strain gage 32 can be installed on the crossbow 10 during manufacturing or alternatively added to the crossbow 10 as an aftermarket component. Prior to installation of the bow string 26 on the bow limbs 14, the bow limbs 14 can be in a fully relaxed state such that the strain on the bow limbs 14 and the strain gage 32 is nominal (e.g., zero). When the bow string 26 is attached to the distal ends 18 of the bow limbs 14 and routed around the cam assemblies 23, and prior to pulling the bow string 26 towards the latch 29, the bow limbs 14 can be in a partially flexed position (e.g., a released position or a rest position). When the bow limbs 14 are in the partially flexed position, the strain measured by the strain gage 32 can be understood to be the baseline strain amount (e.g., tare) from which further strain amounts can be compared. After the bow is strung any variation in this baseline strain value can indicate physical changes to the crossbow 10 such as, for example, string creep, string damage, limb damage or some other form of damage or deformation to a component or accessory of the crossbow 10. These variations can trigger a warning that is presented to the user via the application on the smartphone or via another notification method.

When the bow string 26 is pulled into engagement with the latch 29 to prepare to fire the arrow (e.g., full draw position), the bow limbs 14 can be moved to a fully flexed position (e.g., a cocked position) and the strain measured by the strain gage 32 can be compared to the baseline strain amount and registered (e.g., in the application) as a full draw strain amount. The time to reach full draw and the time held at full draw can also be stored on the application and recalled by the user (e.g., when viewing various statistics related to the user's use of the crossbow 10). In one embodiment, the application can record and generate shot-to-shot statistics for the crossbow 10 for its entire useful life. Each shot from the crossbow 10 can be assigned to different archers to allow for shot-to-shot comparisons among archers (e.g., for competition). In one embodiment, the strain gage 32 can be selectively powered such that power from the power source is only provided to power the strain gage 32 during measurement of the strain characteristics on the crossbow 10. This can prolong the availability of any power stored in the power storage device.

Once the bow string 26 is pulled into the full draw position, the strain value can be used to calculate the kinetic energy for that particular shot. At full draw position, the strain value can vary by small amounts for the crossbow 10 but greater amounts for other archery bows (e.g., recurve bows). In one embodiment, various physical parameters of the arrow (e.g., the weight of the particular arrow/bolt being used and the weight of the broadhead/arrowhead) can be preloaded into the application to facilitate more accurate calculation of the kinetic energy. This can encourage arrow and arrowhead manufacturers to submit their equipment for inclusion in an application hardware look-up table which the user can select from.

In one embodiment, the calculated kinetic energy and the physical parameters of the arrow can be used to calculate a theoretical exit velocity for the arrow. The theoretical exit velocity can be displayed to the user via the application as a 'theoretical' shot statistic. Once the actual shot is taken, the rate of change of strain (first derivative of the strain signal) for the length of travel can be obtained from the strain gage 32 and used to calculate (via the application) the actual exit velocity which can be displayed to the user. The difference between the theoretical exit velocity and the actual exit velocity can represent 'losses' in the equipment setup. In one embodiment, calculating the theoretical exit velocity can include monitoring the strain data (e.g., strain signal) from the strain gage 32 during drawing of the arrow (from the released position to the full draw position) and through strain reversal—the moment after the arrow is fired when the bow limbs 14 'over-travel.' The duration of the strain reversal can indicate the travel time and/or travel rate of the bow string 26 (within a few millisecond accuracy) as it is pushing the arrow. The duration of the strain reversal can be impacted by the physical parameters of the arrow.

It is to be appreciated that strain reversal can facilitate detection of a "dry fire" (releasing the string on a bow without an arrow or bolt) of the crossbow 10 which can be dangerous and can result in damage to the bow limbs 14. If the crossbow 10 is dry-fired, the strain reversal reading can be recorded and can be used by a manufacturer or other warranty provider to evaluate a warranty claim. It is to be appreciated that various other information from sensors on the crossbow 10 can be available to a manufacturer and/or other third parties for use in troubleshooting, product improvement, or any of a variety of other uses.

The strain data from the strain gage 32 can also be used to determine the overall integrity of the crossbow 10. For example, each time the crossbow 10 is fired the strain data (e.g., dynamic strain signal) from the strain gage 32 can be provided to the application and compared to the strain data for other fires of the crossbow 10 (e.g., an average fire data) stored in memory. If there is a significant divergence of the strain data from the average fire data, it might indicate a problem with the integrity of the crossbow 10 (e.g., general and, where possible, specific attributes of bow health), and, when appropriate, might generate a warning to the user via the application.

It is to be appreciated that although a strain gage is described above, any of a variety of suitable alternative strain sensors can be implemented on the bow limb(s) 14 and configured to detect a strain on the bow limb(s) 14, such as, for example, a Hall effect sensor, a capacitive sensor, or a resistive sensor.

Still referring to FIG. 1, the crossbow 10 can include an accelerometer 38 disposed in the riser 13 and configured to detect the movement of the crossbow 10 in three axial directions. The accelerometer 38 can be powered by the same onboard power source used to power the strain gage 32 or can alternatively be powered from a different onboard power source. In one embodiment, the accelerometer 38 can be passively powered such that power from the power source is only provided to power the accelerometer 38 during measurement of the acceleration characteristics on the crossbow 10.

The accelerometer 38 can be communicatively coupled to the computing device (e.g., either wirelessly or with wires) and can transmit acceleration data to the computing device. The acceleration data from the accelerometer 38 can be used to detect the release of the bow string 26 and arrow and can be used as a back-up comparison to calculate string travel time (e.g., to calculate arrow velocity). The accelerometer 38 can also provide an additional or alternative data source to facilitate detection of dry fire as well as bow health. It is to be appreciated that the strain gage 32 and the accelerometer 38 can cooperate to facilitate diagnosis of health related issues by comparing shot-to-shot dynamics as well as comparisons to threshold levels stored on the application that have been created/discovered during research, development, and manufacture of the crossbow 10.

The accelerometer 38 can also be used to detect undesired motion of the crossbow 10 when the crossbow 10 is being aimed at a target. This undesired motion can be indicated to the user (e.g., substantially in real-time) via the application to improve the overall accuracy and shot stability for the user. The movement of the crossbow 10 during a shot can also be recorded by the application and reported to a user as historical data for coaching and encouragement.

It is to be appreciated that although an accelerometer is described above, any of a variety of suitable alternative inertial motion units (IMU) can be implemented on the bow limb(s) 14 and configured to detect a motion of the bow limb(s) 14, such as, for example, a gyroscope, a magnetometer, or an inclinometer.

Still referring to FIG. 1, the crossbow 10 can include a camera 40 (e.g., a CCD camera) disposed in the riser 13 and configured to record use of the crossbow 10 (e.g., during preparation for a shot, during the shot, and/or after the shot). The camera 40 can be powered by the onboard power source (not shown) and can be communicatively coupled to a computing device (e.g., either wirelessly or with wires) to transmit picture data and/or video data to the computing device. In one embodiment, the application can display sight tapes on the smartphone 36 for aiming at a target in real time.

It is to be appreciated that any of a variety of suitable additional or alternative monitoring devices for detecting certain operating conditions are contemplated for the crossbow 10, such as, for example, pressure transducers, displacement transducers for communicating data to a smartphone, a global positioning system (GPS) unit, or other computing device that facilitates analysis of the use of the crossbow 10, such as, for example, shot statistics, bow health, string creep, dry fire detection, draw variability and draw rate. This data can be communicated (either wirelessly or via wires) to the computing device and/or can be downloaded to an onboard memory device (not shown) on the crossbow 10. These monitoring devices can be placed on or embedded within the bow limbs 14, the riser 13, the cam assemblies 23 and/or other suitable location that facilitates monitoring of a parameter of interest. It is also to be appreciated that the data from these monitoring devices can be processed and displayed to a user in an easy to read format (e.g., on the smart phone) or can be additionally or alternatively displayed as raw data and/or an output signal.

Now referring to FIG. 2, various examples of different graphical user interfaces (GUIs) 42a, 42b, 42c, are illustrated. These graphical user interfaces can be generated by the application and can be configured to display different types of information to a user based upon the data received from the monitoring devices (e.g., the strain gage 32, the accelerometer 38, and the camera 40) in a user friendly format. The information presented by the different GUIs can be customizable to present any type of information selected by a manufacturer, a user, or other third party.

An alternative embodiment of a crossbow 110 is illustrated in FIGS. 3-8 and can be similar to or the same as, in many respects as the crossbow 10 illustrated in FIG. 1. For example, the crossbow 110 can include a pair of cam assemblies 123, 124 that are each pivotally attached to a respective distal end 118 of one of the bow limbs 114. The cam assembly 124, however, can include at least one monitoring device that is configured to facilitate detection of an operating condition of the crossbow 110 (e.g., a "smart cam"), as will be described in further detail below.

Figure 3:
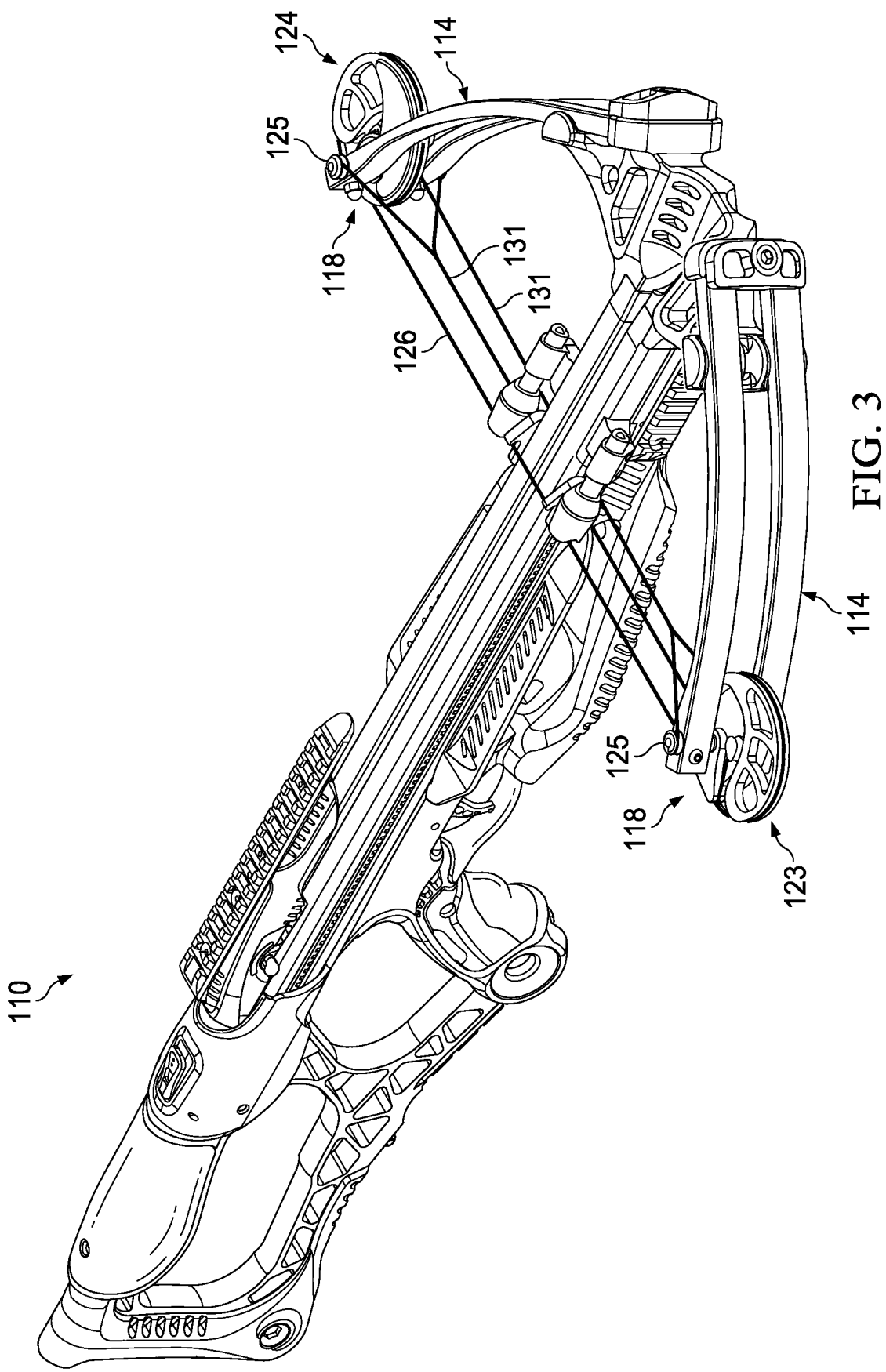
FIG. 3 is an isometric view of a crossbow that includes a pair of cam assemblies, in accordance with another embodiment.
Figure 4:
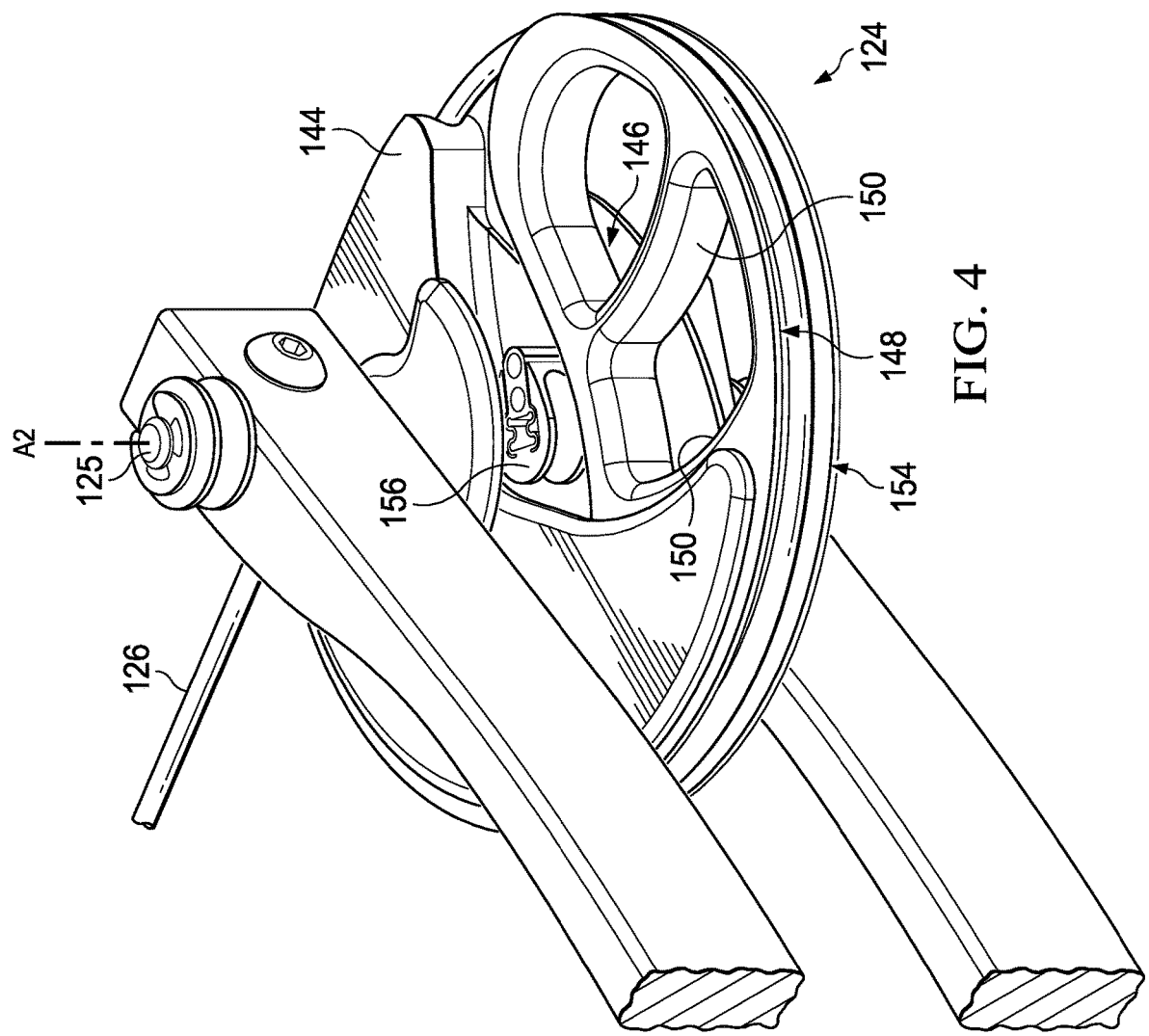
FIG. 4 is an enlarged isometric view depicting one of the cam assemblies of FIG. 3 in association with a bow limb.

Referring now to FIGS. 3 and 4, the cam assembly 124 can include a string cam body 144 that includes a central portion 146, an outer ring portion 148, and a plurality of web members 150 that extend between the central portion 146 and the outer ring portion 148. The central portion 146 can define an aperture 152 (FIG. 5) that defines a pivot axis A2 (FIG. 4) for the cam assembly 124. In particular, a pin 125 can be provided through the aperture 152 to facilitate pivotal coupling of the cam assembly 124 to the bow limb 114. The outer ring portion 148 can define a groove 154 that is circumferentially routed around the pivot axis A2 and is configured to facilitate routing of a bow string 126 around the string cam body 144.

The cam assembly 124 can also include an anchoring lug 156 that is coupled with the string cam body 144 and is offset from the pivot axis A2. The anchoring lug 156 can be configured to facilitate attachment of a bow string 126 (FIG. 4) to the string cam body 144. In one embodiment, the string cam body 144 can define a receptacle 158. The anchoring lug 156 can be disposed in the receptacle 158 such that the anchoring lug 156 is substantially aligned (e.g., in substantially the same plane) with the groove 154.

Figure 6:
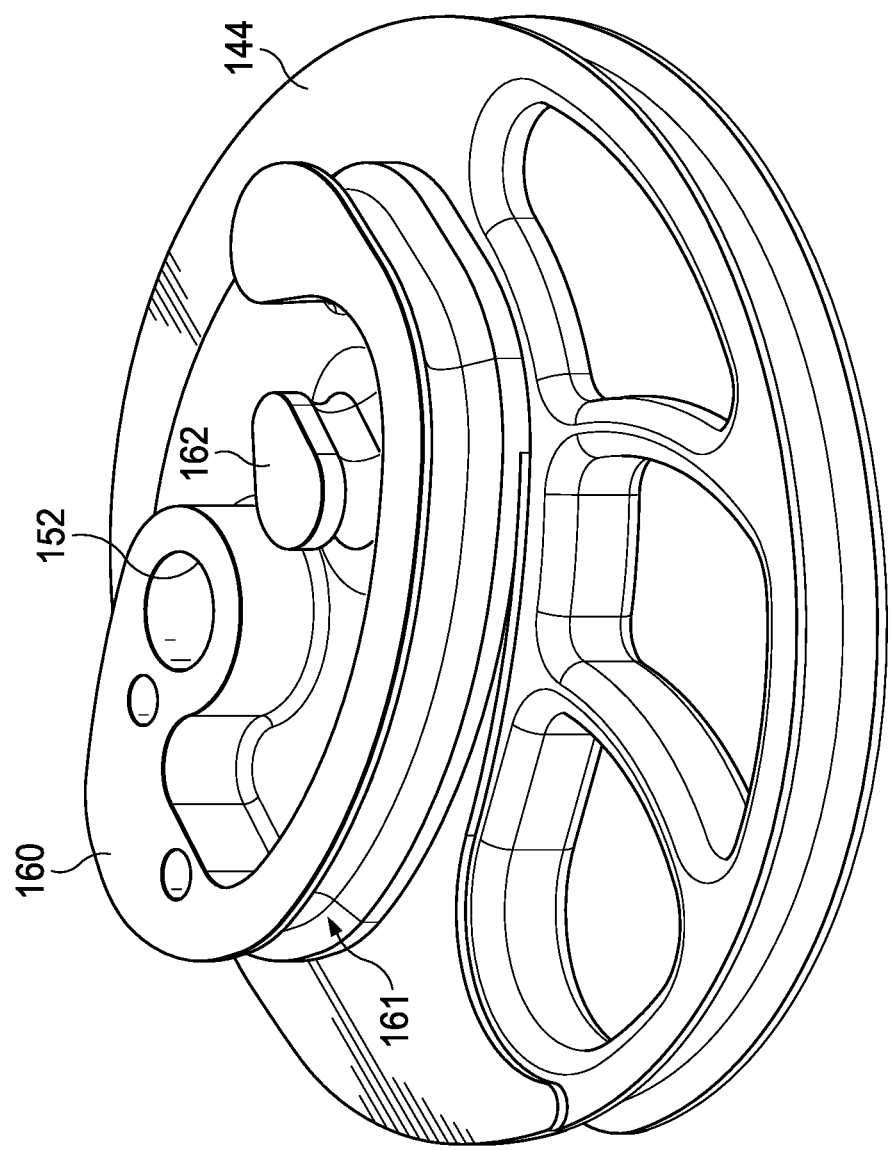
FIG. 6 is a lower isometric view depicting the cam assembly of FIG. 5.

Referring now to FIG. 6, the cam assembly 124 can include a cable cam body 160 that is rigidly coupled with the string cam body 144 and defines a groove 161 that is circumferentially routed around the pivot axis A2 (FIG. 4) and is configured to facilitate routing of a bow cable 131 (FIG. 3) around the cable cam body 160. An anchoring lug 162 can be coupled with the cable cam body 160 and can be configured to facilitate attachment of a bow cable 131 to the cable cam body 160.

Figure 7:
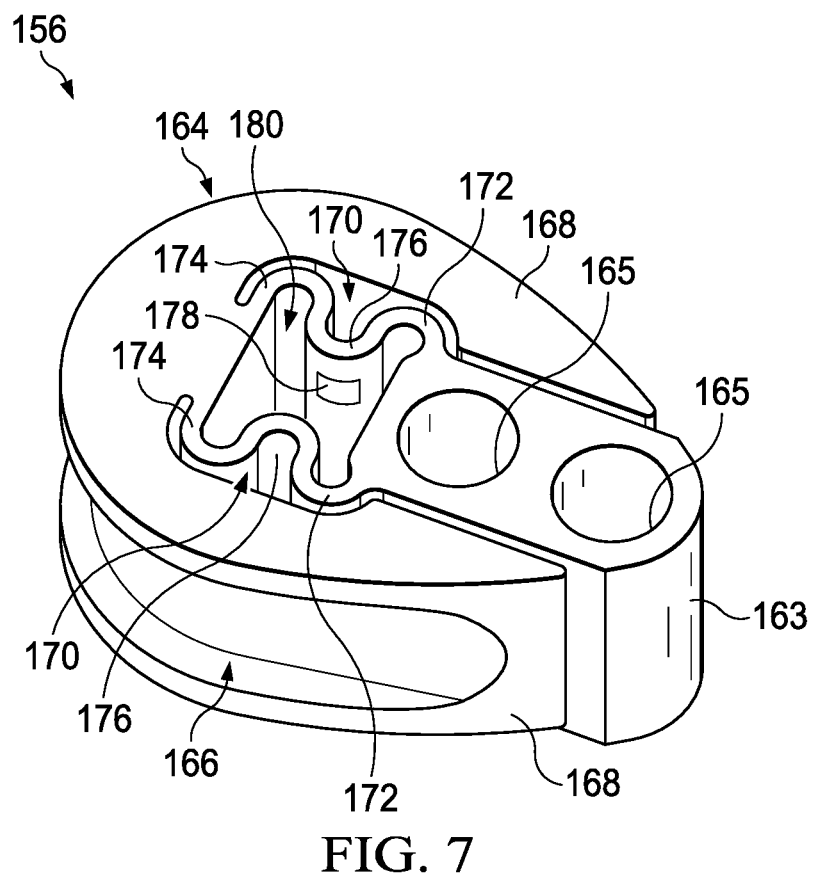
FIG. 7 is an isometric view depicting an anchoring lug of the cam assembly of FIG. 4 with the rest of the cam assembly removed for clarity of illustration.
Figure 8:
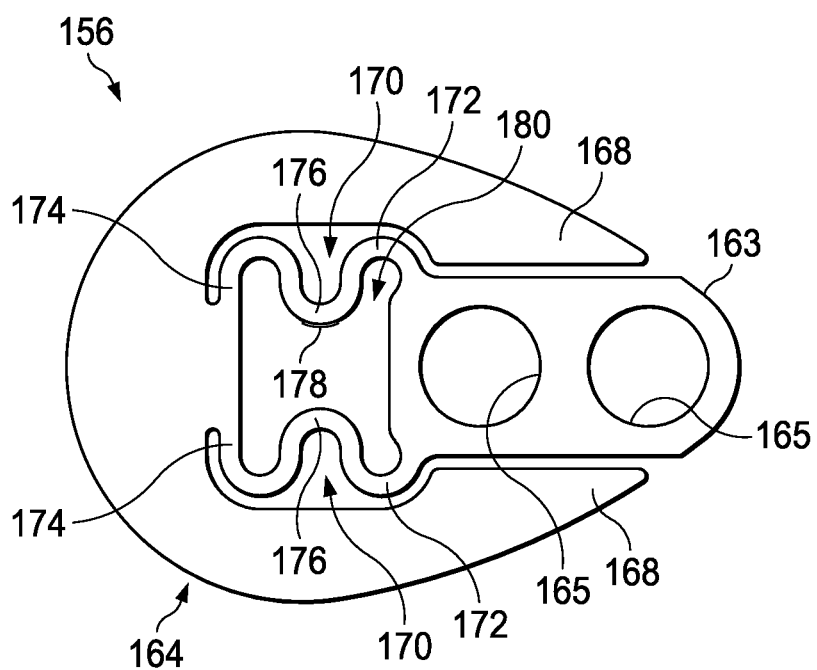
FIG. 8 is a plan view depicting the anchoring lug of FIG. 7.

The anchoring lug 156 for the bow string 126 can be configured as a string tension sensor that is configured to detect the tension on an associated bow string (e.g., 126). Referring now to FIGS. 7 and 8, the anchoring lug 156 can comprise an anchor member 163 and an outer shroud 164. In one embodiment, the anchor member 163 can define a pair of apertures 165 that are each configured to receive a respective fastener (not shown) that facilitates coupling of the anchor member 163 to the string cam body 144. The anchor member 163 can, however, be attached to the string cam body 144 in any of a variety of suitable alternative manners, such as through welding, with adhesive, or integrally formed together with the string cam body 144.

The outer shroud 164 can define an outer groove 166 that is configured to facilitate routing of the bow string 126 around the outer shroud 164. The outer shroud 164 can also include a pair of arm members 168 that are each tapered towards the anchor member 163 such that the outer shroud 164 is substantially tear drop shaped. In an alternative embodiment, the outer shroud 164 can be substantially circular shaped.

The outer shroud 164 can be slidably coupled with the anchor member 163 such that the outer shroud 164 is slidable with respect to the anchor member 163. In one embodiment, as illustrated in FIGS. 7 and 8, the anchoring lug 156 can include a pair of bellows members 170 that facilitate slidable coupling of the outer shroud 164 with the anchor member 163. Each bellows member 170 can include a proximal end 172, a distal end 174, and a flexible portion 176 that extends between the proximal end 172 and the distal end 174. The proximal end 172 of each bellows member 170 can be coupled with the anchor member 163 and the distal end 174 of each bellows member 170 can be coupled with the outer shroud 164. The anchor member 163 and the bellows members 170 can be interposed between the arm members 168 and spaced from the arm members 168 to allow the outer shroud 164 to slide with respect to the anchor member 163.

The flexible portions 176 can be selectively deformable to allow for sliding of the outer shroud 164 relative to the anchor member 163. In one embodiment, the flexible portions 176 can be substantially S-shaped. The flexible portions 176 can be formed of a resilient material that can facilitate a return of the outer shroud 164 to an original position after deformation of the flexible portions 176 has occurred. For example, when a bow string 126 is secured to the anchoring lug 156 (e.g., routed around the outer shroud 164), as illustrated in FIGS. 7 and 8, and tension on the bow string 126 increases (in the direction of the arrow T) (e.g., when the bow string 126 is pulled from a relaxed position to a firing position), the increased tension can cause the flexible portions 176 to deform which can allow the outer shroud 164 to slide towards the anchor member 163. When the tension on the bow string 126 decreases (opposite the direction of the arrow T) (e.g., (e.g., when the bow string 126 is release from the firing position to the relaxed position), the decreased tension can allow the flexible portions 176 to return to a non-deformed state which can cause the outer shroud 164 to slide away from the anchor member 163.

Still referring to FIGS. 7 and 8, the anchoring lug 156 can include a strain gage 178 that is disposed on one of the flexible portions 176 of the bellows members 170. The strain gage 178 can facilitate detection of the deflection or deformation of the flexible portion 176 when the outer shroud 164 moves relative to the anchor member 163 in response to a change in tension on the bow string 126. In particular, when the outer shroud 164 slides relative to the anchor member 163, the strain gage 178 can measure the tension on the bow string 126 as a function of the deflection or deformation of the flexible portion 176 of the bellows member 170. For example, the greater the outer shroud 164 slides relative to the anchor member 163, the greater the bellows member 170 deflects or deforms which can indicate a greater amount of tension on the bow string 126. In one embodiment, the anchor member 163, the outer shroud 164, and the bellows members 170 can cooperate to define a compartment 180, and the strain gage 178 can be disposed in the compartment 180. In other embodiments, however, the strain gage 178 can be associated with the bellows members 170 in any of a variety of suitable alternative locations on the anchoring lug 156 that facilitates detection of a tension on the bow string 126 from the anchoring lug 156. For example, in an alternative embodiment, the anchoring lug 156 can include a pair of strain gages (e.g., 178) that are each provided on different ones of the flexible portions 176. In another alternative embodiment, the strain gage 178 can extend between and contact each of the outer shroud 164 and the anchor member 163.

It is to be appreciated that, although a strain gage is described above to measure the strain produced in the bellows members 170, any of a variety of suitable additional or alternative force sensors can be implemented in an anchoring lug to detect a tension on an associated bow string, such as, for example, a Hall effect sensor, a capacitive sensor, or a resistive sensor which can, in some embodiments, extend between the anchor member 163 and the outer shroud 164, to measure the change in the gap between the anchor member 163 and the outer shroud 164. It is also to be appreciated that the anchoring lug 156 can be configured to facilitate attachment of other bow cords to a cam body. For example, the anchoring lug 156 can be provided on the cable cam body 160 in lieu of the anchoring lug 162 such that the tension of the bow cable 131 can be detected.

Figure 5:
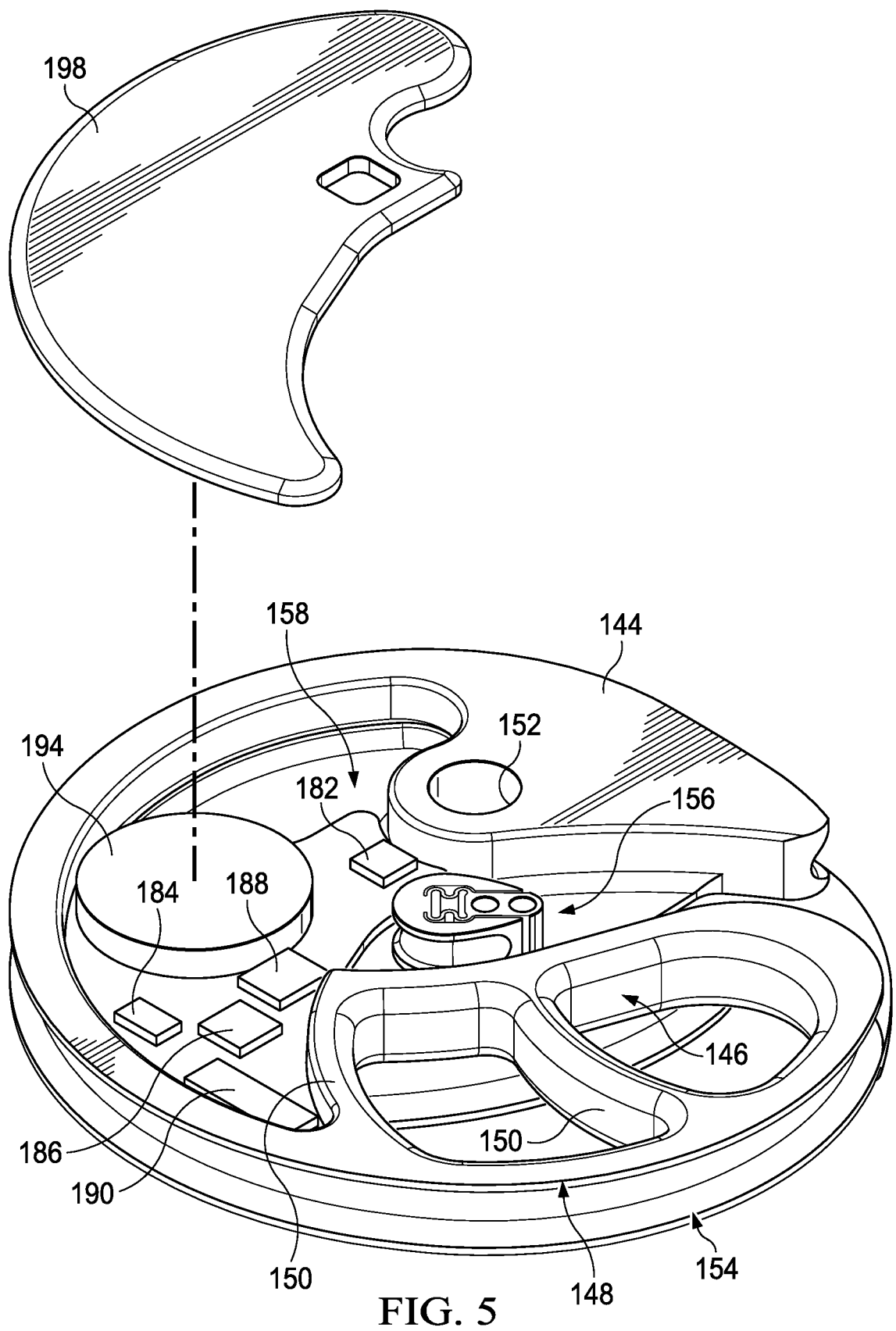
FIG. 5 is a partially exploded upper isometric view depicting the cam assembly of FIG. 4 with the bow limb removed for clarity of illustration.

Referring now to FIGS. 5 and 7, the cam assembly 124 can also include a cam rotation sensor 182 and an IMU 184. The cam rotation sensor 182 can be configured to measure the rotational and/or linear position of the cam assembly 124 (e.g., at rest and/or during a firing event). In one embodiment, the cam rotation sensor 182 can comprise an optical sensor or an encoder. The IMU 184 can be configured to measure the three-dimensional motion and/or the angular rate of the archery bow. In one embodiment, the IMU 184 can comprise an accelerometer, a gyroscope, a magnetometer, or an inclinometer or a combination thereof.

The strain gage 178, the cam rotation sensor 182 and the IMU 184 can be in communication with a controller 186 and can be configured to communicate tension data, position data, and motion data, respectively, (collectively "sensor data) to the controller 186. As will be described in further detail below, the sensor data from each of the strain gage 178, the cam rotation sensor 182, and the IMU 184, as well as data from other sensors on the bow (e.g., a strain gage mounted on the bow limb 14 and a GPS unit) (collectively "the onboard monitoring devices") can be communicated to the controller 186 for use in analyzing and presenting various operational characteristics of the archery bow. The controller 186 can include a processor (not shown) and can be in communication with a memory 188 that supports the operation of the controller 186. It is to be appreciated that, as described above, any of a variety of suitable additional or alternative monitoring devices are contemplated for an archery bow.

The cam assembly 124 can also include a wireless communication module 190 that is in communication with the controller 186 and facilitates wireless communication (via antenna 191 (FIG. 9)) with a remote computing device such as a smartphone (e.g., 36). In particular, the controller 186 can be configured to transmit sensor data from the monitoring devices to the wireless communication module 190, which can, in turn, transmit the sensor data to the remote computing device. The remote computing device can have an application loaded thereon that is configured to present the sensor data from the onboard monitoring devices to a user. The wireless communication module 190 can be enabled to communicate over any of a variety of suitable wireless protocols such as, for example, WiFi, Bluetooth, and Zigbee. In some embodiments, the cam assembly 124 can be configured to communicate via a wired connection, in lieu of or in addition to the wireless communication module 190, such as via a USB cable.

Figure 9:
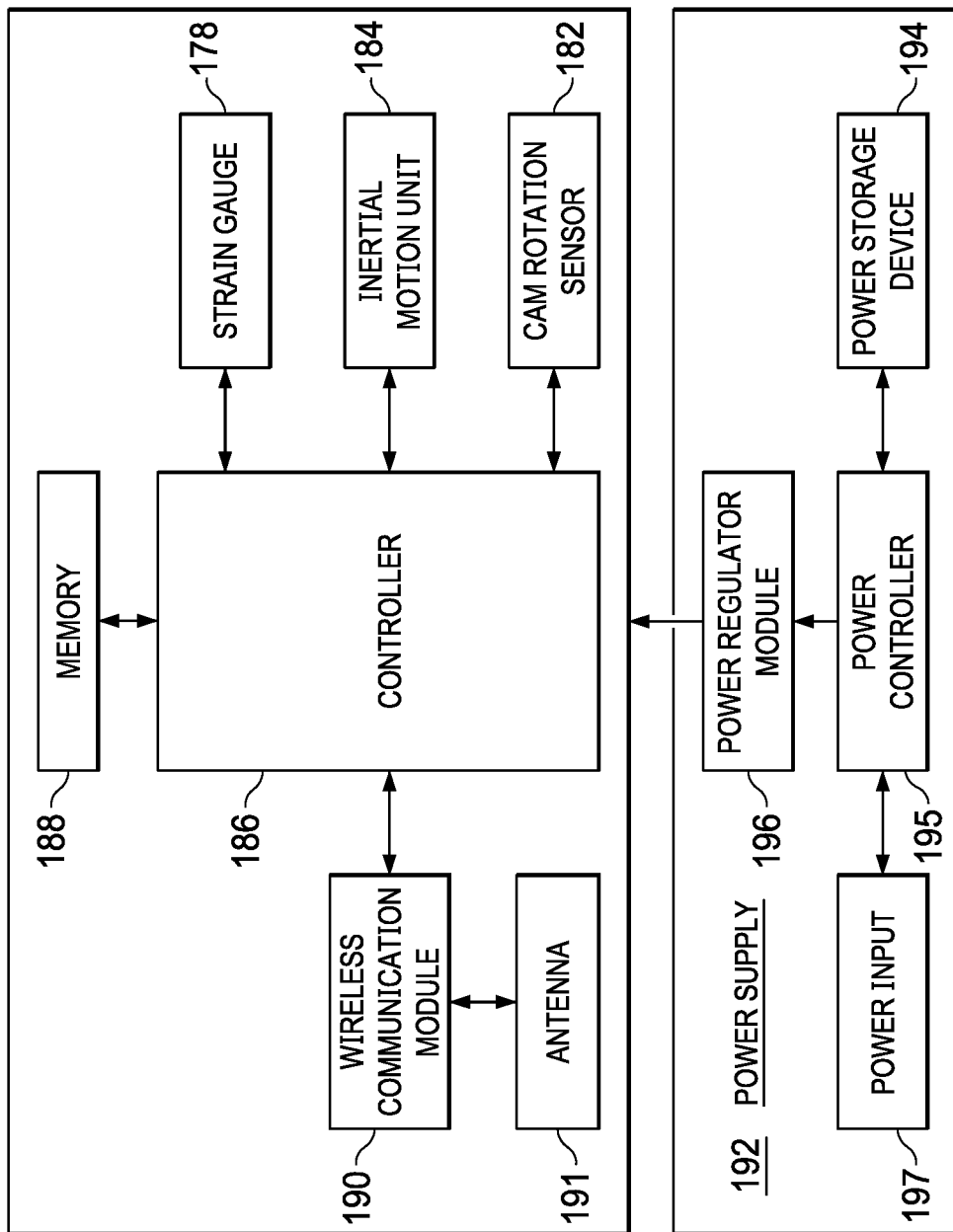
FIG. 9 is a block diagram of the monitoring devices and power supply of the cam assembly of FIG. 5.

As illustrated in FIG. 9, the cam assembly 124 can include a power supply 192 that facilitates powering of the onboard monitoring devices, the controller 186, and wireless communication module 190. The power supply 192 can include a power storage device 194, a power controller 195, a power regulator module 196, and a power input 197. The power storage device 194 can be in communication with the power controller 195 which is in communication with the power regulator module 196. The power controller 195 and the power regulator module 196 can cooperate to regulate and control the power delivered from the power storage device 194 to each of the onboard monitoring devices, the controller 186, and wireless communication module 190. The power controller 195 can also be configured to facilitate management of the charging and overall function of the power storage device 194. In particular, the power controller 195 can regulate the delivery of power to the power storage device 194 to facilitate charging of the power storage device 194 and prevent excessive power from being delivered to the power storage device 194. In one embodiment, the power controller 195 can communicate with the power storage device 194 to facilitate effective delivery of power thereto/therefrom.

The power storage device 194 can be a rechargeable storage device, such as a rechargeable battery (e.g., a lithium ion battery) or supercapacitor. The power input 197 can be in communication with the power storage device 194 and can facilitate selective charging of the power storage device 194. In one embodiment, the power input 197 can comprise a plug that is configured to receive input power from a power cord, such as a wall plug or a USB cable, for example. In other embodiments, the power input can comprise a solar array, an inductive power source, and/or an energy harvesting device (e.g., that harvests/scavenges power from the motion of the cam assembly 124 or bow). During charging of the power storage device 194 from the power input 197, the power controller 195 can regulate and control the charging power delivered to the power storage device 194 to facilitate effective charging of the power storage device 194. In an alternative embodiment, the power storage device 194 can comprise a single use battery that can be selectively replaced (e.g., when depleted). In such an embodiment, the cam assembly 124 can be devoid of the power input 197.

Referring again to FIG. 5, the cam assembly 124 can include a cover member 198 that can selectively overlie and protect each of the strain gage 178, the cam rotation sensor 182, the IMU 184, the controller 186, the memory 188, the wireless communication module 190, and the power supply 192 from exposure to harmful environmental conditions such as dirt and water, for example.

It is to be appreciated that, although the cam assembly 124 is shown and described as being provided on a right side of the crossbow 110, the cam assembly 124 can additionally or alternatively provided on the right side of the crossbow 110 (in lieu of the cam assembly 123).

It is to be appreciated that various different performance parameters for the bow can be determined from the data from the onboard monitoring devices (e.g., by the controller 186 and/or the computing device (e.g., 36)). Various examples of these performance parameters will now be described.

The exit velocity of an arrow or bolt can be determined by measuring the rotational velocity of the cam assembly 124 relative to the geometry of the bow (e.g., from the IMU 184 and/or the strain gage(s)) when the bow is fired).

The draw length of the bow can be determined by measuring the angular position of the cam assembly 124 relative to the geometry of the bow when the arrow is drawn back.

The draw time of the bow can be determined by measuring the elapsed time for the cam assembly 124 to rotate from a relaxed position to a firing position (e.g., the position of peak rotation of the cam assembly 124).

The draw hold time of the bow can be determined by measuring the amount of time the cam assembly 124 remains in the firing position.

The kinetic energy of the arrow or bolt can be calculated by measuring the exit velocity of the arrow from the bow (e.g., from image data generated by the camera) relative to the mass of the arrow. In one embodiment, the mass of the arrow can be predetermined and known to the controller 186 and/or the computing device (e.g., through manual entry).

Statistical information about the bow can be collected over time by logging data from the onboard monitoring devices (e.g., in the memory 188) when the bow is being used. In one embodiment, the data can be logged based upon the time and location data generated by the GPS unit.

The spatial positioning of the bow can be determined by measuring the three-dimensional motion of the bow (e.g., from the motion data generated by the IMU 184) when the bow is fired. In one embodiment, the spatial positioning can be used to detect bow stability, arrow trajectory, and/or rotation of the bow.

The location of the bow can be detected from the GPS unit (e.g., with a smartphone) substantially in real time, which can aid in finding the bow when its location is unknown (e.g., when it is stolen). When a user is hunting with the bow, the location of the bow can be transmitted to other hunters in the area (e.g., via a smartphone). The other hunters in the area that are equipped with a GPS unit (e.g., a bow mounted GPS unit or a smartphone) can transmit their location(s) to the user such that the location of all of the hunters can accordingly be tracked on a digital map (e.g., from a smartphone) and an alert can be sent to other hunters in their vicinity.

It is to be appreciated that the onboard monitoring devices can facilitate diagnosis of an abnormal condition on the archery bow. When an abnormal condition occurs, the smartphone (e.g., 36) can notify the user of the abnormal condition and, in some embodiments, can suggest a solution for correcting the abnormal condition. In some embodiments, a third party can be additionally or alternatively notified to facilitate administration of a warranty program. It is to be appreciated that diagnosis of an abnormal condition on the bow can encourage a proper maintenance schedule for the bow.

A method for detecting a dry fire event (i.e., when the string on the bow is released without an arrow or bolt) on the bow will now be described. A dry fire event can be determined by measuring the rotational velocity of at least one of the cam assemblies 124 relative to the bow limb 114. The velocity of the cam assembly 124 can be compared to a threshold dry fire rotational velocity value. When the bow is dry fired, the velocity of at least one of the cam assemblies 124 can exceed the threshold dry fire rotational velocity value. When this occurs, the smartphone (e.g., 36) can log the dry fire even in the memory 188 (e.g., for later retrieval by a manufacturer) and/or can notify the manufacturer of the dry fire event in substantially real time to facilitate administration of a warranty program.

A method for determining the health of the bow string 126 and/or the bow limbs (e.g., 114) will now be described. The health of the bow string 126 and/or the bow limbs (e.g., 114) can be determined by comparing the angular displacement of at least one of the cam assemblies 124 (e.g., the difference in the angular position of the cam assembly 124 as detected from the anchoring lug 156) over time when the bow string 126 is drawn from a relaxed position and into a firing position. To facilitate such analysis, the angular displacement of at least one of the cam assemblies 124 can be periodically stored in memory 188 (e.g., as historical angular displacement data) when the bow string 126 is drawn from a relaxed position and into a firing position. Each detected angular displacement can then be compared to the historical angular displacement data to determine how much the angular displacement of the cam assembly 124 varies over time. The change in the angular displacement of the cam assembly 124 over time can be compared to a threshold angular displacement value. When the integrity of the bow string 126 has been compromised (e.g., due to excessive wear or damage) and/or the integrity of the bow limbs 114 has been compromised, the angular displacement of the cam assemblies 124 can be reduced and can thus fall beneath the threshold angular displacement value. When this occurs, the smartphone (e.g., 36) can notify the user that the bow string 126 and/or bow limb 114 is damaged or worn out and thus needs to be replaced. In some embodiments, a third party can be additionally or alternatively notified to facilitate administration of a warranty program.

Another method for determining the health of the bow limbs (e.g., 114) will now be described. The health of the bow limbs (e.g., 114) can be determined by detecting the strain on the bow limbs (e.g., from the strain gage 32) during use of the bow. The strain on the bow limbs (e.g., 114) can be compared to a threshold strain failure value. When the integrity of the bow limbs 114 has been compromised, the strain on the bow limbs 114 can be reduced and can thus fall beneath the threshold strain failure value. When this occurs, the smartphone (e.g., 36) can notify the user that the bow limb 114 is damaged or worn out and thus needs to be replaced. In some embodiments, a third party can be additionally or alternatively notified to facilitate administration of a warranty program.

Figure 10:
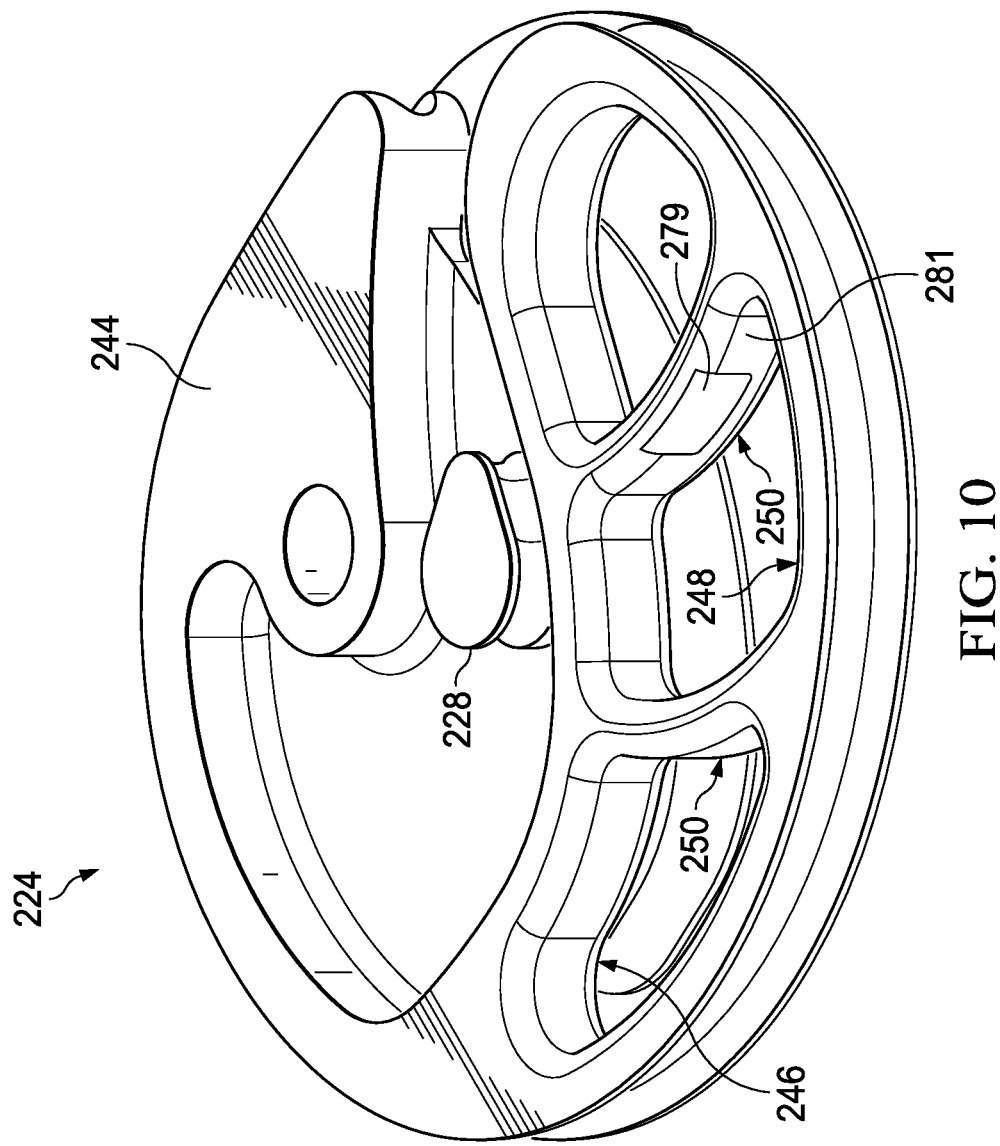
FIG. 10 is an isometric view depicting a cam assembly in accordance with another embodiment.

FIG. 10 illustrates an alternative embodiment of a cam assembly 224 that is similar to, or the same as in many respects as, the cam assembly 124 illustrated in FIGS. 4-7. For example, the cam assembly 224 can include a cam body 244 that includes a central portion 246, an outer ring portion 248, and a plurality of web members 250 that extend between the central portion 246 and the outer ring portion 248. The cam assembly 224 can also include an anchoring lug 228 that is coupled with the cam body 244. However, the anchoring lug 228 can be devoid of a strain gage or other monitoring device that is capable of detecting the tension on an associated bow string (e.g., 26, 126). Instead, the cam assembly 224 can include a strain gage 279 that is disposed on one of the web members 250 and is configured to detect a tension on the bow string (e.g., 26, 126) or bow cord (e.g., 31, 131) from the web member 250. In particular, the web member 250 can comprise an outer surface 281 and the strain gage 279 can be affixed to the outer surface 281, such as with adhesive for example. It is to be appreciated that although a strain gage is described above, any of a variety of suitable alternative strain sensors can be implemented on the web member 250 and configured to detect a strain on the web member 250, such as, for example, a Hall effect sensor, a capacitive sensor, or a resistive sensor.

Figure 11:
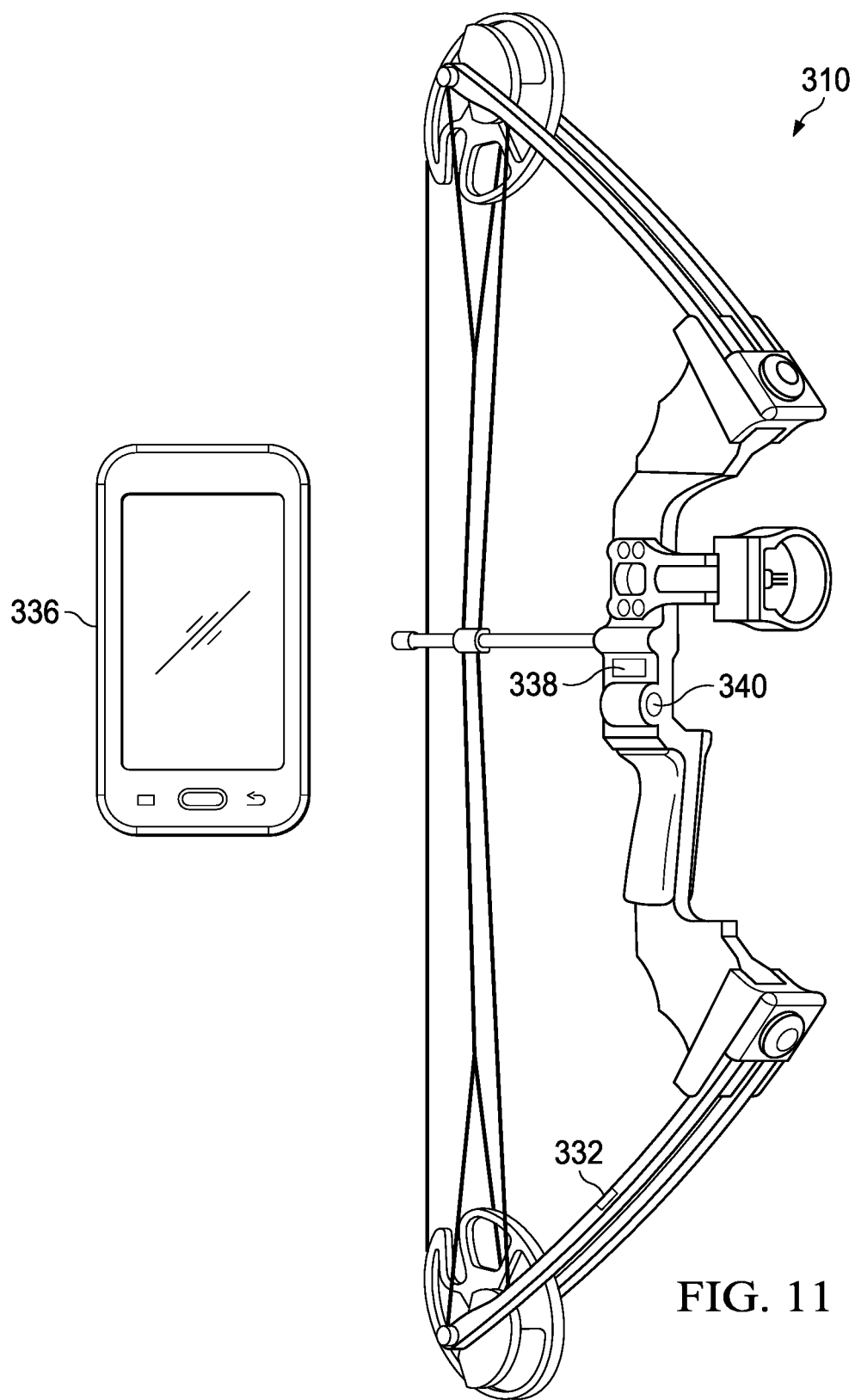
FIG. 11 is a perspective view depicting a compound bow that includes various monitoring devices in communication with a smartphone.

It is to be appreciated that although a crossbow is described above, the system, devices, and methods described herein can be utilized on any archery bow, such as a compound bow (e.g., a vertical/upright compound bow), a long bow, or a recurve bow, for example. For example, a compound bow 310 is illustrated in FIG. 11 and can include a strain gage 332, an accelerometer 338, and a camera 340 that are in communication with a smartphone 336. The strain gage 332, the smartphone 336, the accelerometer 338, and the camera 340 can be similar to or the same as in many respects as the strain gage 32, the smartphone 36, the accelerometer 38, and the camera 40, respectively, illustrated in FIG. 1.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather, it is hereby intended that the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A cam assembly for an archery bow, the cam assembly comprising:
    a cam body; and
    an anchoring lug coupled with the cam body and comprising:
        an anchor member coupled with the cam body;
        an outer shroud movably coupled with the anchor member; and a force sensor configured to facilitate detection of tension on a bow cord coupled with the anchoring lug based upon a position of the outer shroud relative to the anchor member.

2. The cam assembly of claim 1 wherein the force sensor comprises a Hall effect sensor.

3. The cam assembly of claim 1 wherein:
the anchoring lug further comprises a pair of bellows members;
each bellows member of the pair of bellows members is coupled with each of the anchor member and the outer shroud; and
each bellows member of the pair of bellows members is selectively deformable to facilitate slidable coupling of the outer shroud with the anchor member.

4. The cam assembly of claim 3 wherein the anchor member, the outer shroud, and the pair of bellows members cooperate to define a compartment and the force sensor is disposed in the compartment.

5. The cam assembly of claim 1 wherein the outer shroud defines an outer groove.

6. The cam assembly of claim 1 wherein the cam body further defines a receptacle and the anchoring lug is disposed within the receptacle.

7. The cam assembly of claim 1 further comprising a wireless communication module in communication with the force sensor and configured to wirelessly transmit tension data from the force sensor to a remote source.

8. The cam assembly of claim 1 wherein the cam body comprises a central portion, an outer ring portion, and at least one web member that extends between the central portion and the outer ring portion.

9. An archery bow comprising:
a limb attachment member;
a pair of bow limbs, each bow limb of the pair of bow limbs being coupled with the limb attachment member;
a cam assembly pivotally coupled with one bow limb of the pair of bow limbs, the cam assembly comprising:
a cam body; and
an anchoring lug coupled with the cam body and comprising:
a force sensor;
an anchor member coupled with the cam body; and
an outer shroud movably coupled with the anchor member; and
a bow cord coupled with the anchoring lug and routed along the outer shroud, wherein the force sensor is configured to facilitate detection of tension on the bow cord as a function of force imparted to the force sensor from the bow cord.

10. The archery bow of claim 9 wherein the force sensor comprises a Hall effect sensor.

11. The archery bow of claim 9 wherein the bow cord comprises one of a bow string and a bow cable.

12. The archery bow of claim 9 wherein:
the anchoring lug further comprises a pair of bellows members;
each bellows member of the pair of bellows members is coupled with each of the anchor member and the outer shroud; and
each bellows member of the pair of bellows members is selectively deformable to facilitate slidable coupling of the outer shroud with the anchor member.

13. The archery bow of claim 12 wherein the anchor member, the outer shroud, and the pair of bellows members cooperate to define a compartment and the force sensor is disposed in the compartment.

14. The archery bow of claim 9 wherein the outer shroud defines an outer groove.

15. The archery bow of claim 9 wherein the cam body further defines a receptacle and the anchoring lug is disposed within the receptacle.

16. The archery bow of claim 9 further comprising a wireless communication module in communication with the force sensor and configured to wirelessly transmit tension data from the force sensor to a remote source.

17. The archery bow of claim 9 wherein the cam body comprises a central portion, an outer ring portion, and at least one web member that extends between the central portion and the outer ring portion.

18. The archery bow of claim 9 wherein the archery bow comprises a cross bow.

* * * * *